(12) United States Patent
Wilensky (10) Patent No.: US 8,286,102 B1
(45) Date of Patent: Oct. 9, 2012

(54) SYSTEM AND METHOD FOR IMAGE PROCESSING USING MULTI-TOUCH GESTURES

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 97 days.

(21) Appl. No.: 12/789,223

(22) Filed: May 27, 2010

(51) Int. Cl.
*G06F 3/033* (2006.01)
*G06F 3/048* (2006.01)

(52) U.S. Cl. .................. 715/863; 715/854; 715/782
(58) Field of Classification Search .............. 715/863, 715/854, 782
See application file for complete search history.

(56) References Cited

U.S. PATENT DOCUMENTS

| | | | |
|---|---|---|---|
| 6,337,925 B1 | 1/2002 | Cohen et al. | |
| 6,570,557 B1* | 5/2003 | Westerman et al. | 345/173 |
| 6,778,698 B1 | 8/2004 | Prakash et al. | |
| 7,030,861 B1* | 4/2006 | Westerman et al. | 345/173 |
| 7,593,603 B1 | 9/2009 | Wilensky | |
| 7,940,250 B2* | 5/2011 | Forstall | 345/173 |
| 7,956,847 B2* | 6/2011 | Christie | 345/173 |
| 7,975,242 B2* | 7/2011 | Forstall et al. | 715/863 |
| 2011/0074710 A1* | 3/2011 | Weeldreyer et al. | 345/173 |
| 2011/0093821 A1* | 4/2011 | Wigdor et al. | 715/863 |

OTHER PUBLICATIONS

Pedro F. Felzenszwalb, et al. "E±cient Graph-Based Image Segmentation," vol. 59, Issue 2 (Sep. 2004), pp. 167-181 (26 pages), Year of Publication: 2004.
James Malcolm, et al., "A Graph Cut Approach to Image Segmentation in Tensor Space," Computer Vision and Pattern Recognition, 2007. CVPR '07. IEEE Conference on in Computer Vision and Pattern Recognition, 2007. CVPR '07. IEEE Conference on (2007), pp. 1-8.

* cited by examiner

*Primary Examiner* — William Bashore
*Assistant Examiner* — David Phantana Angkool
(74) *Attorney, Agent, or Firm* — Robert C. Kowert; Meyertons, Hood, Kivlin, Kowert & Goetzel, P.C.

(57) ABSTRACT

Various embodiments of a system and methods for processing digital images using multi-touch gestures are described. A multi-touch gestural input set which comprises a plurality of touch gestures may be applied to a display of an image. The gestural input set may include different gesture types, such as mobile and stationary gestures. Each gesture type may indicate a different image processing constraint that may be applied to modify the digital image. Stationary gestures may indicate constrained regions of the image that are not subject to modification. Mobile gestures may indicate regions of the image which may be subject to modification. Characteristics of the mobile gestures, such as velocity and/or pressure, may also indicate an amount by which an image may be modified over the region indicated by the mobile gesture. Image masks, which separate foreground and background regions of an image, may also be specified by the gestural input set.

20 Claims, 7 Drawing Sheets

○ Mobile Gesture   ● Stationary Gesture

○ Mobile Gesture    ● Stationary Gesture

SYSTEM AND METHOD FOR IMAGE PROCESSING USING MULTI-TOUCH GESTURES

BACKGROUND

Touch gesture technology provides hardware and software that allows computer users to control various software applications via the manipulation of one or more digits (e.g., finger(s) and/or thumb) on the surface of a touch-enabled device. Touch gesture technology generally consists of a touch-enabled device such as a touch-sensitive display device (computer display, screen, table, wall, etc.) for a computing system (desktop, notebook, touchpad, tablet, etc.), as well as software that recognizes multiple, substantially simultaneous touch points on the surface of the touch-enabled device. Touch gestures may also be multi-touch gestures. An example of a multi-touch gesture is making a "pinching" motion with two fingers to zoom in on an image displayed on a multi-touch capable display. Conventional multi-touch gestures may involve multiple touches on the surface of a touch-enabled device. However, conventional systems allow multiple touches within a multi-touch gestural input set to specify only a single action or command to be executed.

Conventional image editing systems are limited to a single input which specifies a global adjustment to be applied to an entire image. Conventional image editing systems require multiple inputs, executed in a serial, iterative manner, in different image editing modes of an image editing application, to specify different image constraints for various local regions of an image. For example, specifying an image region to remain static and an image region to be modified, requires at least two separate inputs, in two different image editing modes, in a conventional image editing system. Conventional methods require serial indications of foreground and background regions of an image, which must be made in multiple different modes of a software application (e.g. foreground selection mode and background selection mode). Accordingly, conventional methods require multiple steps to apply different image processing constraints or to create a complex image mask with multiple regions.

SUMMARY

Various embodiments of a system and methods for image processing using multi-touch gestures are described. The system for image processing using multi-touch gestures, as described herein, may provide a mechanism for a multi-touch gestural input set to specify multiple image processing constraints. A digital image may be displayed on a touch-sensitive display device. A user may apply a multi-touch gestural input set to the surface of, or proximate to the surface of, the touch-sensitive display to specify multiple image processing constraints for the digital image. The multi-touch gestural input set may include multiple touch gestures of different gesture types. Each gesture type may specify a different image processing constraint. For example, the multi-touch gestural input set may include both stationary touch gestures and mobile touch gestures. The stationary touch gestures may specify one type of image processing constraint, while the mobile touch gestures may specify a different type of image processing constraint. The multiple touch gestures of different gesture types may be interpreted by the system as a multi-touch gestural input set. In other embodiments, the system described herein may not be limited to multi-touch gestures. The system may be used with any input device that is configured to sense multiple motions of a gestural input (e.g., gestural inputs in two-dimensional or three-dimensional space).

The multi-touch gestural input set applied to the display of the digital image may specify various types of image processing constraints. For example, the multi-touch gestural input set may specify image modification constraints to be applied to the digital image. In such an example, stationary touch gestures of the multi-touch gestural input set may specify image constraint regions, i.e., regions that may not be changed by an image modification. Mobile touch gestures of the multi-touch gestural input set may specify image regions that may be changed by an image modification. As another example, the multi-touch gestural input set may specify the creation of a mask for the image, which may select an object of the image and/or identify foreground and background regions of the image.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and methods for image processing using multi-touch gestures are described herein. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a system and methods for processing digital images using multi-touch gestures are described herein. The system for processing digital images using multi-touch gestures may provide image editing software users a faster and more intuitive mechanism for specifying image editing constraints. The system may provide a mechanism for a user to specify multiple, different image processing constraints for a digital image via a multi-touch gestural input set. The user may specify the image processing constraints by applying the multi-touch gestural input set to a display of the digital image on a touch-enabled device. The multi-touch gestural input set may include multiple, different touch gesture types. Each touch gesture type may specify a different type of image processing constraint. For example, the multi-touch gestural input set may include both stationary touch gestures and mobile touch gestures. The stationary touch gestures may specify one type of image processing constraint, while the mobile touch gestures may specify a different type of image processing constraint.

Embodiments of a system for processing digital images using multi-touch gestures may be implemented by a multi-touch gesture module. The multi-touch gesture module may analyze the multiple touch gestures of a multi-touch gestural input set to determine the image processing constraints specified by the touch gestures. The image processing constraints specified by the touch gestures may indicate image modification constraints to be applied to the digital image. For example, stationary touch gestures of the multi-touch gesture input may specify image constraint regions, i.e., regions that may not be changed by an image modification. Mobile touch gestures of the multi-touch gesture input may specify image regions that may be changed by an image modification. Characteristics of the mobile touch gesture (e.g., velocity, pressure) may also specify a degree of modification to be applied to the image. In other words, the mobile touch gesture characteristics may specify an amount by which the specified region of the image may be modified. As another example, the multi-touch gesture may specify the creation of a mask for the image. The mobile touch gestures may specify a background region for the mask and the stationary touch gestures may specify a foreground region for the mask.

The system for processing digital images using multi-touch gestures may be implemented in an image editing application, including, but not limited to Adobe® Photoshop®, Adobe® Lightroom®, or Abode® Camera Raw®. For example, a multi-touch gesture may add flexibility to a Curves adjustment mechanism for digital images in Adobe® Photoshop®. The multi-touch gesture may include one or more mobile touch gestures and one or more stationary touch gestures, which may be simultaneously applied to a display of the digital image while Adobe® Photoshop® is in a Curves adjustment mode. In other embodiments, the touch gestures of the multi-touch gestural input set may not be simultaneously applied, but may still be considered part of the multi-touch gestural input set. The one or more mobile touch gesture may specify one or more regions of the digital image that are constrained and should not be affected by the Curves adjustment. The one or more stationary touch gestures may specify one or more regions of the digital image to which the Curves adjustment should be applied. Characteristics of the one or more stationary touch gestures (e.g., velocity, pressure) may also specify a degree of modification to be applied to the image. In other words, the mobile touch gesture characteristic may specify an amount of change that the Curves adjustment should apply to the specified image regions. Accordingly, a user may edit the digital image by specifying multiple, different image editing constraints with a multi-touch gestural input set. Other examples of Adobe® Photoshop® image editing tools which may use such a multi-touch gestural input set are Black and White conversion, Hue Saturation adjustment, Color Temperature correction, and White Clipping Points for Levels adjustment. As another example, the image distortion tools of Adobe® Photoshop®, such as the Liquify, Free Transform and Puppet tools, may also use such a multi-gestural input. For example, the multi-touch gestural input set may specify image regions that may be subject to distortion and image regions that may not be subject to distortion. Note that the examples of Adobe® Photoshop® image editing and distortion tools are provided only as examples to illustrate how the system for processing digital images using multi-touch gestures may be used in an image editing application and are not meant to be limiting in any way.

As another example, the system for processing digital images using multi-touch gestures may be implemented in an image editing application to create a mask for a digital image. For example, a multi-touch gesture which includes both mobile and stationary touch gestures may be used for the Quick Select or Select by Color Range algorithms of Adobe® Photoshop®. An embodiment of the Quick Select algorithm is described in U.S. patent application Ser. No. 11/517,189, entitled "LIVE COHERENT IMAGE SELECTION," filed Sep. 6, 2006, whose inventors are Gregg D. Wilensky, Scott D. Cohen, and Jen-Chan Chien, and which is hereby incorporated by reference herein in its entirety. The mobile touch gestures may serve as positive control points which may specify positive (foreground) regions of an image to be included in a mask of the image. The stationary touch gestures may serve as negative control points which may specify negative (background) regions of an image to be removed from a mask of the image. Accordingly, a user may specify a complex image mask, or selection region, using a multi-touch gestural input. Note that the examples of Adobe® Photoshop® selection and mask generation tools are provided only as examples to illustrate how the system for processing digital images using multi-touch gestures may be used in an image editing application and are not meant to be limiting in any way.

In other embodiments, the system described herein may not be limited to multi-touch gestural inputs. The system may provide a method for processing digital images using gestures other than touch gestures applied to the surface of a touch-enabled device. The system may be used with any input device that is configured to sense gestural motions at multiple locations. For example, the system may be used with an input device that is configured to sense gestural motions in two-dimensional or three-dimensional space. An example of such an input device may be a surface that is configured to sense non-contact gestures that are performed while hovering over the surface, rather than directly contacting the surface. As another example, the system may be used with an input device that is configured to sense a combination of touch gestures and non-contact gestures. As yet another example, the system may be used with any type of computing input device, such as a stylus input applied to a tablet PC or a conventional input pointing device, such as a mouse. In such an example, a mouse click may be a stationary input and a mouse drag with the mouse button depressed may be a mobile input.

As described above, the system for processing digital images using multi-touch gestures may be implemented as a multi-touch gesture module. Embodiments of a multi-touch gesture module, which may be implemented as or in a tool, module, plug-in, stand-alone application, etc., may be used to process a digital image in response to multi-touch gestures applied to a touch-enabled device. For simplicity, implementations of embodiments of the system for processing digital images using multi-touch gestures described herein will be referred to collectively as a gesture module.

Figure 1:
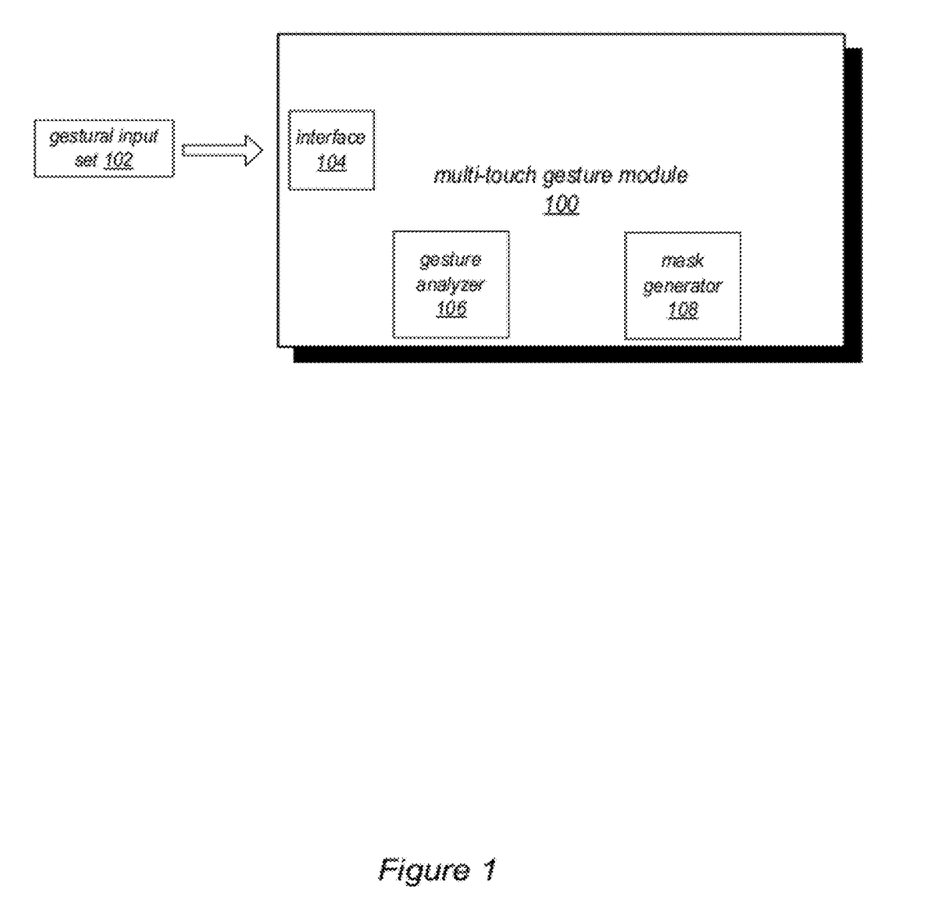
FIG. 1 illustrates an example of a multi-touch gesture module which may be used to process digital images according to a multi-touch gestural input set, according to some embodiments.

FIG. 1 illustrates an example of a multi-touch gesture module (element 100 of FIG. 1) which may be used to process digital images according to a multi-touch gestural input set, according to some embodiments. As illustrated in FIG. 1, gesture module 100 may receive gestural input set 102 via interface 104. The input received via interface 104 may be gesture parameters which describe multiple touch gestures that are included in gestural input set 102. For example, a user may execute the multiple touch gestures, i.e. the gestural input, on a touch-enabled device. Touch gesture data which represents the parameters of the touch gesture may be captured by a device driver of the touch-enabled device and sent to module 100. Gesture module 100 may receive the touch gesture parameters, via interface 104, from the device driver. Gesture analyzer 106 may analyze the touch gesture data to determine the characteristics of the multi-touch gesture. For example, gesture analyzer 106 may determine characteristics such as velocity, pressure and shape. Based on the determined characteristics, gesture analyzer 106 may identify the different gesture types of the multi-touch gesture. For example, dependent on the velocities of the touch gestures, gesture analyzer 106 may identify stationary touch gestures and mobile touch gestures of the multi-touch gestural input set. Mask generator 108 of module 100 may generate an image mask based on the identified gesture types. The mask may be an intermediate constraint mask which may be used to constrain an editing operation for the image. The mask may also be used to generate a mask for an image, for example, to identify foreground and background regions of the image.

Figure 2:
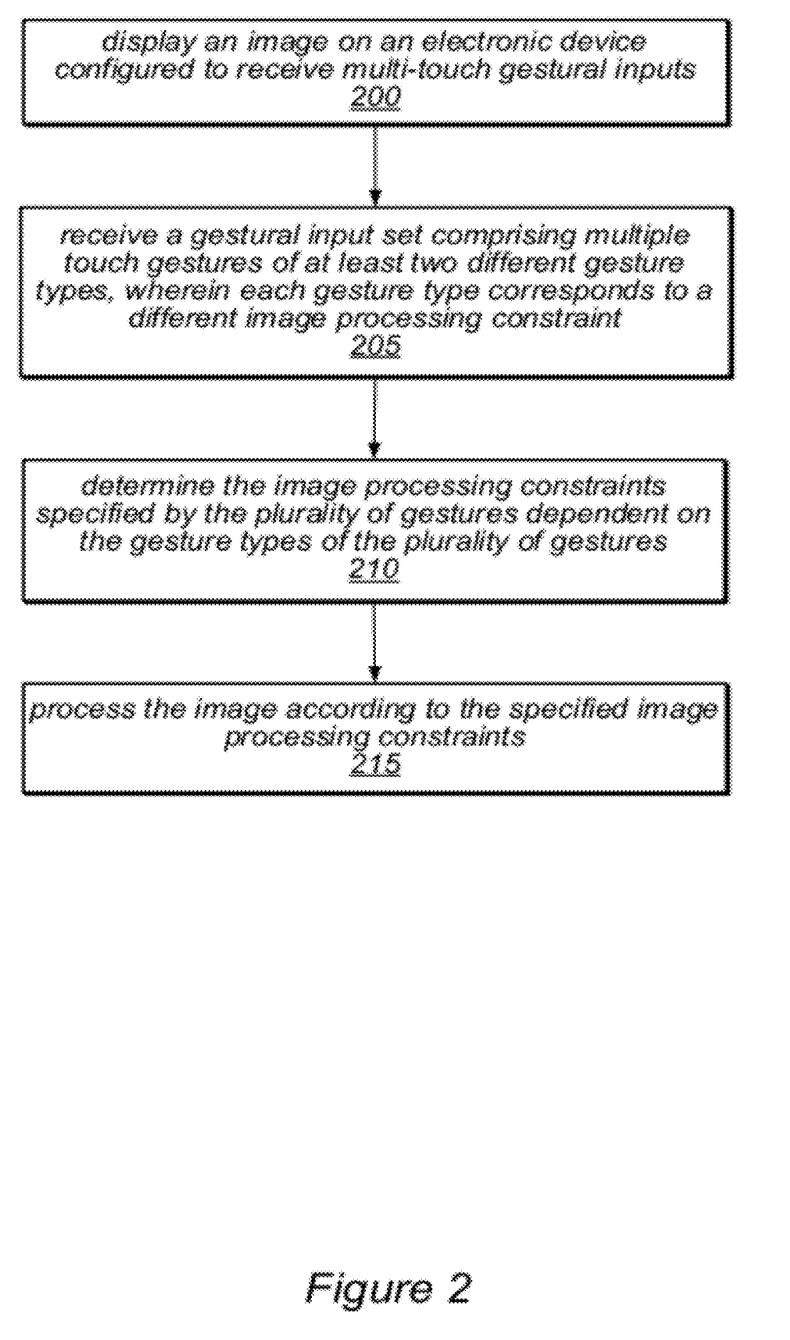
FIG. 2 is a flowchart of a general method for processing a digital image according to image processing constraints specified by a multi-touch gestural input set, according to some embodiments.

FIG. 2 is a flowchart of a general method for processing a digital image according to image processing constraints specified by a multi-touch gestural input set, according to some embodiments. The method illustrated by FIG. 2 may, for example, be implemented by gesture module 100. As indicated at 200 of FIG. 2, the method may include displaying a digital image on an electronic device configured to receive multi-touch gestural input sets. Examples of digital images may include, but are not limited to, images captured by a digital camera, photographs scanned into a computer system, and video frames extracted from a digital video sequence. Digital image file types may include, but are not limited to Joint Photographic Experts Group (JPEG) files, Graphics Interchange Format (GIF) files, Tagged Image File Format (TIFF) files, or Portable Network Graphics (PNG) files.

Figure 3:
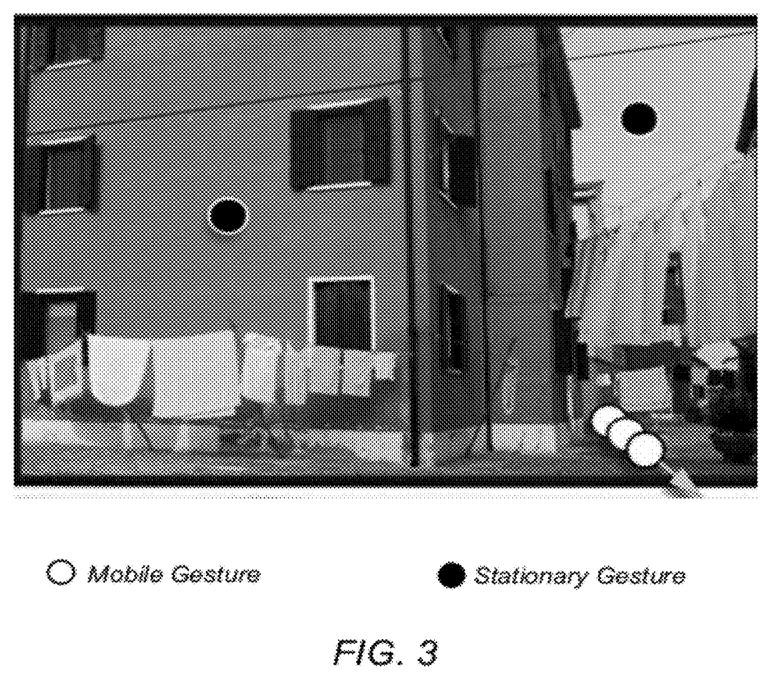
FIG. 3 illustrates an example of a multi-touch gestural input set applied to a display of a digital image, according to some embodiments.

As an example, the digital image may be displayed by an image editing software application to allow a user to make modifications to the digital image. A user may enter an editing mode of the software application to begin an image editing process. For example, a user may select an "Edit" menu option, and/or the user may select a particular editing tool within the software application to enter the editing mode. A user may make modifications to the displayed image while in the editing mode of the software application. Some examples of such modifications may be color, brightness, and/or hue adjustments. The user may apply a multi-touch gesture to the display of the image to specify constraints for the image modification. FIG. 3 illustrates an example of a multi-touch gestural input set applied to a display of a digital image, according to some embodiments. The dark circles on the digital image of FIG. 3 may indicate stationary touch gestures and the light circles on the digital image of FIG. 3 may indicate mobile touch gestures.

As indicated at 205, the method illustrated in FIG. 2 may include receiving a gestural input set comprising multiple touch gestures of at least two different gesture types, wherein each gesture type corresponds to a different image processing constraint. For example, gestural input set 102 may be received by gesture module 100 via interface 104. As described in further detail below, gestural input set 102 may include touch gesture data which represents the parameters of the multiple touch gestural input set. The touch gesture data may be captured by a device driver of a touch-enabled surface on which the touch gestures are applied. The touch gesture data may be sent by the device driver to gesture module 100. As an example, the touch gesture data may represent parameters of the touch gestures such as spatial coordinates (i.e., coordinate locations on the surface of the touch-enabled device) and pressure values (i.e., an amount of pressure with which the gesture is applied). Other gesture parameters may also be represented by the touch gesture data.

Gestural input set 102 may include a plurality of multi-touch gestures. At least two of the multi-touch gestures of gestural input set 102 may be of different gesture types. For example, one of the plurality of multi-touch gestures of gestural input 102 may be a stationary gesture and another one of the plurality of multi-touch gestures of gestural input 102 may a mobile gesture. Each gesture type that is included in gestural input 102 may specify a different type of image processing constraint. For example, a stationary gesture type may specify a constrained region of an image that is not subject to modification during an image editing process. As another example, a mobile gesture type may specify an unconstrained region of an image that is subject to modification during an image editing process.

As indicated at 210, the method illustrated in FIG. 2 may include determining the image processing constraints specified by the plurality of gestures dependent on the gesture types of the plurality of gestures. For example, gesture analyzer 106 of module 100 may analyze gestural input set 102 to determine the image processing constraints specified by gestural input set 102. As described above, gestural input set 102 may specify multiple different image processing constraints. Gesture analyzer 106 may determine (i.e., may distinguish between) the multiple different image processing constraints while operating within a single editing mode of an image editing software application. More specifically, gesture analyzer 106 may provide a mechanism for recognizing the multiple different image processing constraints without switching, or changing, image editing modes with the image editing software application. Gesture analyzer 106 may analyze the received touch gesture data to determine the characteristics of the multi-touch gesture. As described above, the multi-touch gestural input set received by module 100 may include multiple touch gestures. The multiple touch gestures may have various characteristics, such as velocity, amount of pressure applied to the surface of the touch-enabled device, gesture shape, etc. A multi-touch gestural input set may include one or more stationary touch gestures and one or more mobile touch gestures, as illustrated in FIG. 3. As an example, gesture analyzer 106 may analyze the touch gesture data to determine a velocity for each touch gesture. Dependent on the determined velocities, gesture analyzer 106 may identify the stationary touch gestures and the mobile touch gestures.

Based on the identified gesture types (e.g., stationary or mobile), gesture analyzer 106 may determine the image processing constraints specified by the touch gestures. The stationary touch gesture(s) may specify one type of image processing constraint, while the mobile touch gesture(s) may specify another type of image processing constraint. For example, stationary touch gesture(s) may specify one or more constrained image regions. A constrained image region may be a region which may not be affected by an image modification. As an example, the stationary touch gestures of FIG. 3 may specify regions of the image that are constrained from modification. Mobile touch gesture(s) may specify one or more image regions to which an image modification may be applied. As an example, the mobile touch gesture of FIG. 3 may specify a region which may be subject to an image modification. In addition, as described in further detail below, the mobile touch gesture(s) may also specify a degree of modification that may be applied to the image.

Dependent on the identified gesture types, mask generator 108 of module 100 may generate an image mask based on the image processing constraints of the gesture types. The mask may be an intermediate constraint mask which may be used to constrain the image modification specified by the user. For example, the user may have selected a brightness tool to adjust the level of brightness of the image. Stationary touch gestures applied by the user to the display of the image may indicate regions of the image which may be constrained from the modification. More specifically, such regions of the image may not be modified by the brightness adjustment. Mobile touch gestures applied by the user to the display of the image may indicate regions of the image which are unconstrained, and, therefore, may be subject to the modification. More specifically, such regions of the image may be modified by the brightness adjustment. As described in further detail below, mask generator 108 may also generate a mask which may be used to select particular objects within the scene of an image or to identify foreground and background regions of the image.

Figure 4A:
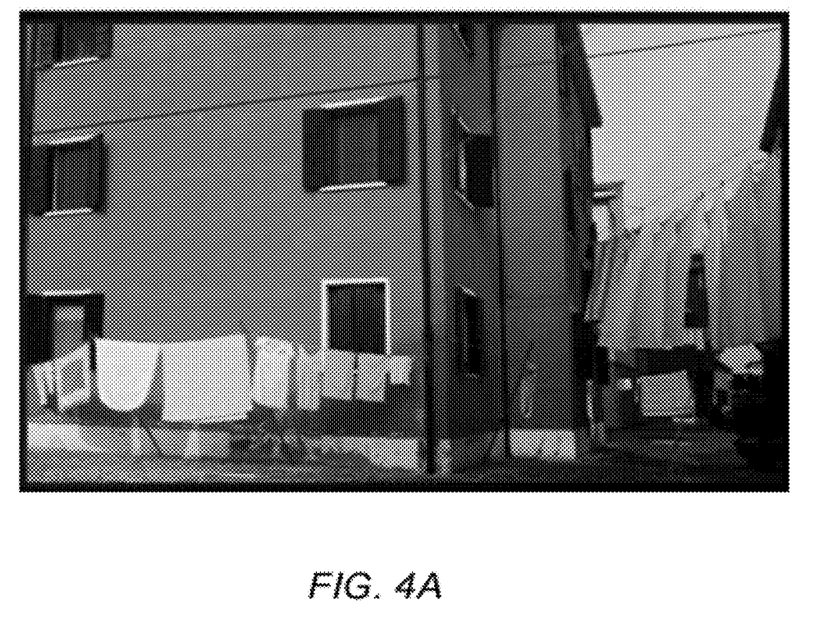
FIG. 4A illustrates an example of a digital image that has been modified according to different image processing constraints specified by a multi-touch gestural input set, according to some embodiments.
Figure 4B:
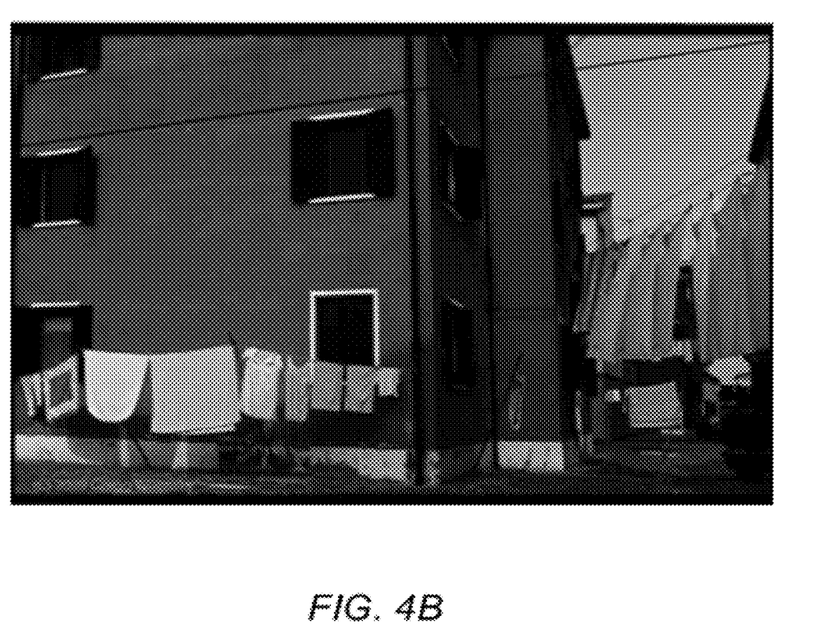
FIG. 4B illustrates an example of image modifications applied globally to a display of a digital image, according to some embodiments.

As indicated at 215, the method illustrated in FIG. 2 may include processing the image according to the specified image processing constraints. For example, dependent on the image processing constraints specified by the multi-touch gesture, a digital image may be modified. As an example, FIG. 4A indicates a modified version of FIG. 3. FIG. 4A has been modified according to the image processing constraints specified by the multi-touch gesture illustrated in FIG. 3. The brightness level of the lower right corner of the image shown in FIG. 4A, i.e., the region specified by the mobile touch gesture shown in FIG. 3, has been modified. The brightness level of the remaining region of the image shown in FIG. 4A, i.e., the region specified by the stationary touch gestures shown in FIG. 3, has not been modified. Accordingly, FIG. 4A illustrates an example of a digital image that has been modified according to different image processing constraints specified by a multi-touch gestural input set. For comparison, FIG. 4B illustrates an example of a digital image to which a brightness adjustment has been globally applied. As shown in FIG. 4B, the entire image has been darkened in response to the global brightness adjustment, rather than just a portion of the image, as shown in FIG. 4B.

Figure 5:
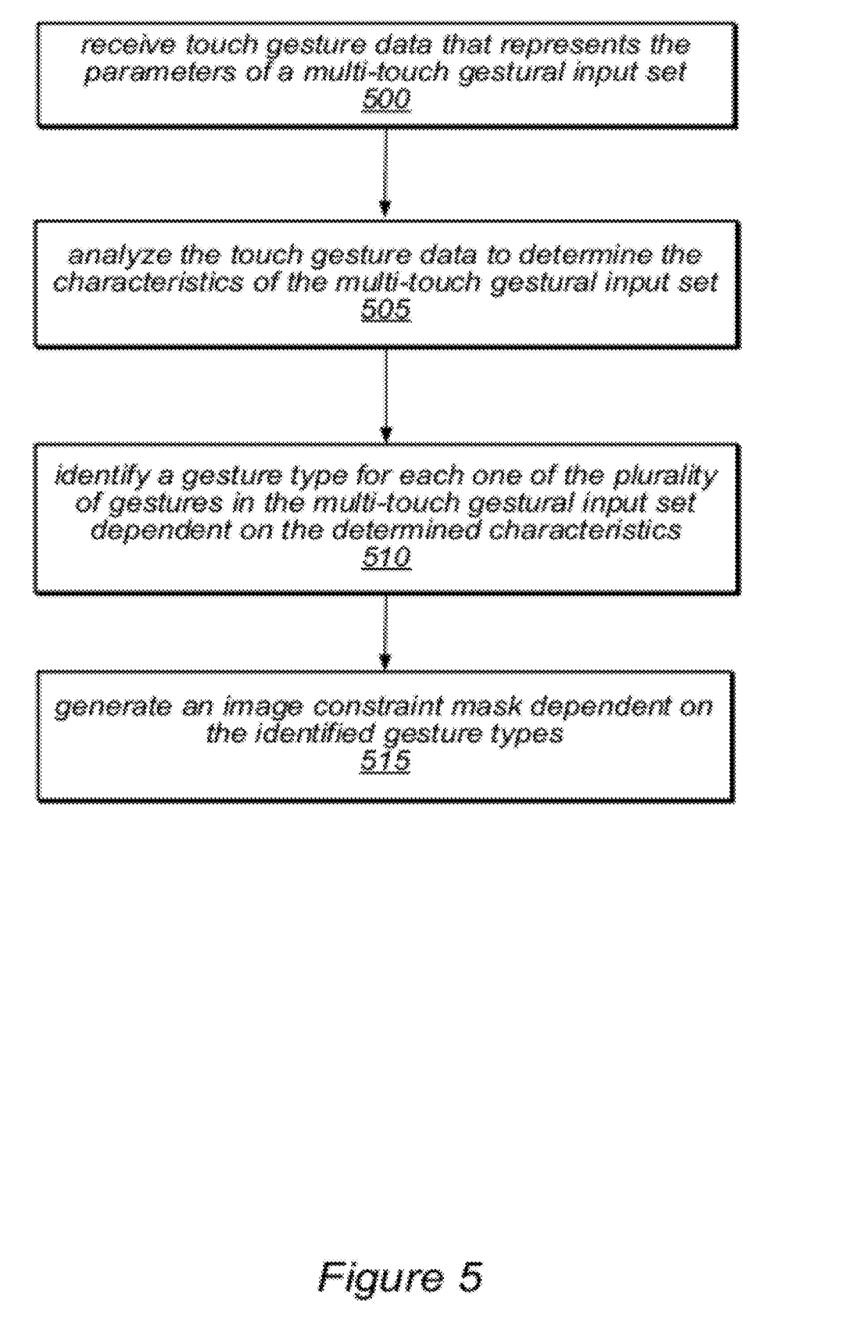
FIG. 5 is a flowchart of a general method for analyzing a multi-touch gestural input set to determine the image processing constraints that are specified by the multi-touch gestural input set, according to some embodiments.

FIG. 5 is a flowchart of a general method for analyzing a multi-touch gestural input set to determine the image processing constraints that are specified by the multi-touch gestural input set, according to some embodiments. The method illustrated in FIG. 5 may, for example, be implemented by gesture module 100. As illustrated at block 500 of FIG. 5, the method for analyzing a multi-touch gestural input set may include receiving touch gesture data that represents the parameters of the multi-touch gestural input set. As described above, a multi-touch gestural input set may include multiple touch gestures which may be applied to the surface of a touch-enabled device.

A device driver of the touch-enabled device, or the operating system running on the touch-enabled device, may capture touch gesture data from the surface of the touch-enabled device and send the touch gesture data to gesture module 100. The touch gesture data may represent various parameters of the multi-touch gesture, dependent on the capabilities of the touch-enabled device. For example, the touch gesture data may include spatial coordinates (i.e., coordinate locations on the surface of the touch-enabled device) which represent the positions of the multi-touch gesture as the gesture is executed. The touch gesture data may also include a timestamp for each spatial coordinate, which may indicate a time at which the particular spatial coordinate was touched. Such timestamp data may be used to determine the velocity of a touch gesture. As another example, the touch gesture data may also include pressure values which indicate the amount of pressure with which a touch gesture is applied to the surface of the touch-enabled device. Note that pressure values for a touch gesture may be provided only by touch-enabled devices which are configured to sense the amount of pressure applied during the application of a touch gesture. Accordingly, embodiments of the system for processing digital images using multi-touch gestures may or may not depend on touch gesture pressure values in order to perform gesture analysis.

The multi-touch gesture may include a plurality of touch gestures and each touch gesture may be represented by multiple spatial coordinates. For example, a stationary touch gesture may be represented by a set of proximate coordinates which represent the area covered by the stationary touch gesture. A mobile touch gesture may be represented by a set of coordinates which represent the gesture's motion across the surface of the touch-enabled device. Accordingly, a multi-touch gestural input set may be represented by a plurality of spatial coordinates. The device driver, or operating system, may create a software recognizable representation of each spatial coordinate captured for the multi-touch gesture. Each representation of a spatial coordinate may, for example, include a horizontal component (i.e., an "x" component) and a vertical component (i.e., a "y" component) which identify a location of the touch gesture on the surface of the touch-enabled device. As an example, the device driver, or operating system, may form a software vector structure which may contain the multiple coordinate pairs that represent the spatial coordinates of a multi-touch gesture. Each element of the software vector may contain a pair of coordinate values, for example, an (x,y) pair of coordinate values. Each element of the software vector structure may also contain the relative timestamp which corresponds to the coordinate pair of the element and indicates a time at which the coordinate location was touched during execution of the touch gesture.

In some embodiments, the touch-enabled device may be configured to sense pressure values. In such embodiments, the device driver, or operating system, may also include, in each element of the software vector, the pressure value which may correspond to the coordinate pair of the software vector element. The device driver, or operating system, may make the software representation of the touch gesture data (i.e., the software vector structure) available to gesture analyzer 106, or may send the software representation, i.e. gesture input 102, to gesture module 100 via interface 104.

As illustrated at block 505, the method illustrated in FIG. 5 may include analyzing the received touch gesture data to determine the characteristics of the multi-touch gestural input set. Block 505 may be implemented by gesture analyzer 106 of gesture module 100. Gesture analyzer 106 may receive, via interface 104, touch gesture data which represents gesture parameters such as spatial coordinates, timestamps and pressure values. For example, gesture analyzer 106 may receive a software vector structure which contains the touch gesture data in elements representing each touch point of the gesture. Gesture analyzer 106 may analyze the touch gesture data to determine the characteristics of the multi-touch gesture. For example, the gesture characteristics may include pixel locations (i.e., locations on a digital image), velocity, pressure and shape.

Gesture analyzer 106 may translate the spatial coordinates of the multi-touch gesture to corresponding pixel locations on the digital image. Gesture analyzer 106 may designate each pixel location with a representation such as r(x,y), where x and y may represent the horizontal and vertical coordinates, respectively, of the pixel location on the image. Gesture analyzer 106 may, for each pixel location, determine a color value at the pixel location. For example, gesture analyzer 106 may evaluate the color histogram of the image at a particular pixel location to determine the color of the particular pixel. A pixel in a grayscale image may have a single color value. A pixel in a color image may have three color values, for example red, green and blue, which may represent the different color components of the pixel. Gesture analyzer 106 may designate a color value for a pixel location as c(x,y), where x and y may represent the coordinates of the pixel on the image. Accordingly, each pixel location, translated from a spatial coordinate of a multi-touch gesture, may be represented by components such as r(x,y) and c(x,y), which may represent the pixel and the color of the pixel at coordinates (x,y).

For each pixel location r(x,y) of a multi-touch gesture, gesture analyzer 106 may determine a velocity of the touch gesture at the pixel location r(x,y). The velocity of a touch gesture at a pixel location may represent the speed of the touch gesture at the particular pixel location. As described above, each spatial location of the touch gesture may have a corresponding timestamp which indicates a time at which the particular spatial coordinate was touched during the execution of the touch gesture. Accordingly, each pixel location translated from a spatial coordinate may be associated with a timestamp. Gesture analyzer 106 may use the associated timestamps for adjacent pixel locations within an image to determine the velocity of a touch gesture at a particular pixel location. For example, gesture analyzer 106 may calculate the velocity of a touch gesture at a particular pixel location by determining the distance between pixel locations adjacent to the particular pixel location and determining the difference between the timestamps for the adjacent pixel locations. Gesture analyzer 106 may then divide the pixel distance by the time difference to determine the touch gesture velocity at the particular pixel location.

As indicated at 510, the method illustrated in FIG. 5 may include identifying a gesture type for each one of the plurality of gestures in the multi-touch gestural input set dependent on the determined characteristics. Gesture characteristics such as velocity, pressure, and/or shape may be used to distinguish between different gesture types. For example, the velocity characteristics of a multi-touch gesture may distinguish mobile touch gestures from stationary touch gestures. As another example, pressure characteristics of a multi-touch gesture may distinguish "light" gestures (i.e., a small amount of pressure is applied) from "heavy" gestures (i.e., a large amount of pressure is applied). As yet another example, shape characteristics of a multi-touch gesture may also distinguish different types of gestures. For example, a gesture which forms a circle may be distinguished from a gesture which forms a straight line. In various embodiments, these gesture characteristics may be used alone, or in a variety of combinations, possibly in combination with other types velocity characteristics, to distinguish different types of gestures.

Gesture analyzer 106 may determine a gesture type according to the characteristics determined for individual pixel locations. For example, dependent on the determined velocity for a pixel location of a touch gesture, gesture analyzer 106 may determine that the touch gesture is mobile or stationary at that particular pixel location. Gesture analyzer 106 may form a group of pixel locations at which a multi-touch gesture is stationary and another group of pixel locations at which a multi-touch gesture is mobile. For example, gesture analyzer 106 may compare the determined velocity for each pixel location to a pre-defined velocity threshold. The pre-defined velocity threshold may represent a velocity level which designates the presence or absence of motion at a pixel location in a touch gesture. For example, a touch gesture may be considered to be "mobile" at a pixel location which has a velocity equal to, or greater than, the defined velocity threshold. Pixel locations that have a corresponding velocity which is below the defined velocity threshold may be grouped together as a set of "negative polarity" coordinates. The group of "negative polarity" coordinates may be considered "stationary" coordinates. Pixel locations that have a corresponding velocity which is greater than, or equal to, the defined velocity threshold may be grouped together as a set of "positive polarity" coordinates. The group of "positive polarity" coordinates may be considered "mobile" coordinates.

Gesture analyzer 106 may form a group {r1} which represents the set of "positive polarity" coordinates. Group i may include the set of pixel locations that have corresponding velocities that are greater than, or equal to, the velocity threshold. Accordingly, group {r1} may include pixel locations at which a touch gesture is considered to be in motion. As an example, {r1} may have n pixel locations 1, 2, 3, . . . n which may be represented as shown in equation 1:

$$\{r1\}=\{r11,r12,r13,\ldots r1n\} \quad (1)$$

which may be a shorthand notation for the expression:

$$\{r1\}=\{(x11,y11),(x12,y12),(x13,y13),\ldots (x1n,y1n)\} \quad (2)$$

The set of pixel locations {r1} may be represented by a corresponding set of velocity values:

$$\{v1\}=\{v11,v12,v13,\ldots v1n\} \quad (3)$$

Each velocity value may represent the velocity of the touch gesture determined for a corresponding pixel location. For example, v11 may represent the velocity of the gesture at pixel location r11.

Gesture analyzer 106 may form a group {r0} which represents the set of "negative polarity" coordinates. Group {r0} may include the set of pixel locations that have corresponding velocities that are less than the velocity threshold. Accordingly, group {r0} may include pixel locations at which the touch gesture is considered to be stationary. As an example, {r0} may have n pixel locations 1, 2, 3, . . . n which may be represented as shown in equation 4:

$$\{r0\}=\{r01,r02,r03,\ldots r0n\} \quad (4)$$

which may be a shorthand notation for the expression:

$$\{r0\}=\{(x01,y01),(x02,y02),(x03,y03),\ldots (x03,y0n)\} \quad (5)$$

Group r{0} may not have a corresponding set of velocity values, as the velocities for the pixel locations of group {r0} are considered to be effectively zero, since the touch gesture is considered stationary at these pixel locations.

Gesture analyzer 106 may also determine a pressure value for each pixel location. As described above, a pressure value may indicate the amount of pressure applied at a particular location during the execution of a touch gesture. The pressure values may be provided by the device driver of the touch-enabled device on which the touch gesture is executed. A set of pressure values may be represented as {p0, p1} for corresponding pixel locations {r0, r1}. In an embodiment in which the touch-enabled device is not configured to sense pressure values of a touch gesture, all pressure values may be set to one.

Gesture analyzer 106 may also associate a set of shapes, {s0, s1}, with each touch gesture. The shape of a touch gesture may be represented by a value equivalent to an area of the touch-enabled surface which is covered by a touch gesture. The shape of a touch gesture may also be represented by a value which indicates a particular shape "drawn" by a touch gesture, for example, the shape of a circle. The set of shapes {s0, s1}, may contain values which represent the shapes of corresponding pixel locations {r0, r1}. Gesture analyzer may form software vector structures to represent the data sets r{0}, r{1}, v{1}, i and {s0, s1}, although other software representations of the data sets are possible in other embodiments.

As indicated at 515, the method illustrated in FIG. 5 may include generating an image constraint mask dependent on the identified gesture types. For example, mask generator 108 of gesture module 100 may generate a constraint mask according to the types of the different touch gestures which form the multi-touch gestural input set. As described above, the multiple touch gestures may specify the image processing constraints to be applied to the image. The image processing constraints may be used by mask generator 108 to generate the image constraint mask. As described above, the multiple touch gestures may be classified as different types of gestures, dependent on the characteristics of the touch gestures. Each different type of touch gesture may specify a different type of image constraint. For example, a touch gesture may be classified as mobile or stationary, dependent on the velocities determined for the pixel locations of the touch gesture. The classification of a touch gesture may determine the type of image processing constraint represented by the touch gesture.

A stationary touch gesture that is applied to a display of a digital image may indicate one or more locations of the digital image that may not be affected by a subsequent image modification. More specifically, the regions of a digital image that are indicated by a stationary touch gesture may be constrained, such that image modifications applied to the digital image do not affect the indicated regions of the digital image. FIG. 3 illustrates an example of two stationary touch gestures applied to a display of a digital image. The two stationary touch gestures of FIG. 3, illustrated by dark circles, indicate regions of the digital image that may be constrained, such that the regions are not affected by a subsequent modification to the image. For example, one dark circle indicates that the middle to upper left region of the image is constrained, and the other dark circle indicates that the upper right region of the image is constrained.

A mobile touch gesture that is applied to a display of a digital image may indicate one or more regions of the digital image that may be affected by a subsequent image modification. The parameters of the mobile touch gesture may also indicate an amount of change that may be applied to the indicated regions of the image. For example, the velocity, pressure, and/or shape of a mobile touch gesture may indicate a degree of change for an image region that may be modified. A mobile touch gesture applied to a display of a digital image is illustrated in FIG. 3. The mobile touch gesture of FIG. 3 is illustrated by a succession of light circles that proceed diagonally toward the lower right corner of the image. The mobile touch gesture of FIG. 3 may indicate, for example, that an image modification is to be applied to the bottom right corner of the image and the velocity of the mobile touch gesture may indicate how much the bottom right corner should be changed.

As described above, the pixel locations of a multi-touch gesture may be grouped into a set of "negative polarity" coordinates, {r0}, and a set of "positive polarity" coordinates, {r1}. The "negative polarity" coordinates, {r0}, may represent stationary pixel locations of the multi-touch gesture. The "positive polarity" coordinates, {r1}, may represent mobile pixel locations of the multi-touch gesture. Referring to the example multi-touch gesture illustrated in FIG. 3, coordinates {r0} of the stationary touch gestures (i.e., the dark circles) may specify regions of the image which may be constrained and coordinates {r1} of the mobile touch gesture (i.e., the light circles) may specify an unconstrained region of the image which may be modified. The corresponding set of velocities, {v1}, pressures {p0, p1}, and shapes {s0, s1} for the pixel locations $\{r0\}$ and $\{r1\}$ may indicate a degree of change for the unconstrained image region.

An original digital image, prior to modification, may be represented by the expression Image0. An image modification which may be applied to Image0, according to the image processing constraints specified by a multi-touch gesture, may be represented by the expression A(Image0). Accordingly, a modified image, Image1, may be expressed as shown in equation (6):

$$\text{Image1} = A(\text{Image0}) \quad (6)$$

As described above, the image modification may be constrained as specified by the multi-touch gestures applied to the display of the image. A constraint mask may be generated to designate the constrained and unconstrained regions of an image. For example, the constraint mask may specify unconstrained regions as determined by pixel locations $\{r1\}$, and constrained regions of the image, as determined by pixel locations $\{r0\}$. Accordingly, a constraint mask may be created according to the multi-touch gestural input set. The constraint mask may be represented by equation (7):

$$\text{Constraint\_Mask}(r) = \text{constraint\_}f(r, \{r1\}, \{r0\}) \quad (7)$$

Constraint_f may be a function which forms the constraint mask dependent on the different gesture types. Each pixel location in the digital image may have a corresponding pixel in the constraint mask. The value of each pixel in the constraint mask, Constraint_Mask (r), may be calculated according to the function constraint_f. Constraint_Mask (r) may be set to a value of one at unconstrained pixel locations (i.e., locations $\{r1\}$) and constraint_mask (r) may be set to a value of zero at constrained pixel locations (i.e., locations $\{r0\}$). As described in further detail below, for pixel locations other than the pixel locations indicated by $r\{1\}$ and $r\{0\}$, intermediate values between zero and one may be calculated for the constraint mask.

Image2 may be an image that is modified according to the location constraints (i.e., the constraint mask) specified by the multi-touch gestural input set. In other words, Image2 may be a blend of the original image Image0 and the Constraint_Mask. Image2 may be generated using Constraint_Mask (r) as indicated in equation (8):

$$\text{Image2} = (\text{Constraint\_Mask} * \text{Image1}) + ((1 - \text{Constraint\_Mask}) * \text{Image0}) \quad (8)$$

Substituting equation (6) into equation (8) results in equation (9):

$$\text{Image2} = (\text{Constraint\_Mask} * A(\text{Image0})) + ((1 - \text{Constraint\_Mask}) * \text{Image0}) \quad (9)$$

Referring to equation (9), at locations where the Constraint_Mask is 1, image modification A(Image0) may be applied to Image0, and at locations where the Constraint_Mask is 0, no image modification is applied to Image0. For example, equation (10) represents Image2 with values of 0 and 1 applied to Constraint_Mask:

For example, substituting a value of 0 for Constraint_Mask into equation (9) yields:

$$\text{Image2} = (0 * A(\text{Image0})) + ((1 - 0) * \text{Image0}) \quad (10)$$

$$\text{Image2} = \text{Image0} \quad (11)$$

Accordingly, as shown by equations (10) and (11), at pixel locations where Constraint_Mask has a value of 0 (i.e., where the image may be constrained), Image2 is equivalent to Image0, i.e., Image0 remains unchanged.

As another example, substituting a value of 1 for Constraint_Mask into equation (9) yields:

$$\text{Image2} = (1 * A(\text{Image0})) + ((1 - 1) * \text{Image0}) \quad (12)$$

$$\text{Image2} = A(\text{Image0}) \quad (13)$$

Accordingly, as shown by equations (12) and (13), at pixel locations where Constraint_Mask has a value of 1 (i.e., where the image may be modified), Image2 is equivalent to AImage0, i.e., Image0 is modified according to A(Imageo).

In some embodiments, the constraint function may also use the color information of the image to determine the constraint mask, as shown in equation (14), where Image1 represents the color value for a pixel location r:

$$\text{Constraint\_Mask}(r) = \text{constraint\_}f(\text{Image1}, r, \{r1\}, \{r0\}) \quad (14)$$

Using the color information to determine the constraint mask may result in a constraint mask that is formed according to the color boundaries of the image. For example, in one embodiment, a flood fill of the image colors at each pixel location r0 may be executed to fill the mask constraint with a value of 0 in the color regions which contain pixel locations $\{r0\}$. For example, if a particular pixel location r0 indicates a location on a red shirt that may be constrained from image modifications, then the entire image region which contains the red shirt may also be constrained from image modification. In other words, the constraint mask would fill the region which contains the red shirt with values of 0, rather than just setting a value of 0 for the constraint mask at the pixel location indicated by r0. Similarly, mask constraint regions which may indicate regions of the image that may be modified may also be determined according to the color boundaries of the image. In such a case, color regions which contain pixel locations r1 may be filled with values of 1 to generate the portion of the mask constraint which may be subject to modification. In other embodiments, other algorithms may be employed to use color information of an image to generate a constraint mask. For example, a "bilateral" modulation may be used to produce a product of a spatial Gaussian function and a color Gaussian function.

In other embodiments, image segmentation algorithms may be used to generate a constraint mask. More specifically, image segments which contain pixel locations $\{r0\}$ may be identified. In the regions identified by these image segments, the constraint mask may be given a value of 0 to indicate that image modifications may not be applied to the identified image segments. Similarly, image segments which contain pixel locations $\{r1\}$ may be identified and corresponding areas of the constraint mask may be given values of 1 to indicate image segments to which modifications may be applied.

Various standard segmentation algorithms may be employed in different embodiments to calculate regions of the constraint mask which correspond to the positive and negative pixel locations. For example, a graph-cut image segmentation algorithm may be employed to determine different segments of the constraint mask. A graph-cut segmentation algorithm may, for example, determine boundaries between image segments using a graph-based representation of the image. As another example, watershed algorithms may be employed to determine image segments dependent on the topography of color gradients within an image.

As described above, for pixel locations other than the pixel locations indicated by $r\{1\}$ and $r\{0\}$, intermediate values between zero and one may be calculated for corresponding pixel locations of the constraint mask. Function constraint_f, as shown above in equation (7), may be an interpolation of values from all of the identified gesture points (i.e., $\{r0\}$ and $\{r1\}$). The function constraint_f (r, $\{r1\}$, $\{r0\}$) may be defined such that the set of pixel locations {r0} have constraint mask values equivalent to 0 and the set of pixel locations {r1} have constraint mask values equivalent to 1. In some embodiments, the function constraint{r1}f may be a polynomial interpretation. For example, a linear function may be used to produce linear gradients that respect the constraint values of {r0} and {r1}.

Equations (15)-(17) are examples of a linear interpolation which respects the constraint values of {r0} and {r1}. Equations (15)-(17) assume the presence of two touch gesture pixel locations: one "positive polarity" pixel location (r1) and one "negative polarity" pixel location r(0). Equations (15)-(17) may be used to interpolate a constraint mask value for a pixel location r:

$$\text{constraint\_f1\_a}(r)=0 \text{ for } [(r-r0)\bullet n]<0 \quad (15)$$

$$\text{constraint\_f1\_a}(r)=1 \text{ for } 1\leftarrow[(r-r0)\bullet n]/|r0-r1| \quad (16)$$

$$\text{constraint\_f1\_a}(r)=[r-r0)\bullet n]/|r1-r0| \text{ for all other values of } r \quad (17)$$

where n is a unit vector pointing towards r1 from r0:

$$n=(r1-r0)/|r1-r0| \quad (18)$$

and where "●" indicates a two-dimensional vector dot product

In some embodiments, the linear gradient represented in equations (15)-(17) may be modulated by color differences in the image. For example, mask constraint values for pixel locations r may be calculated dependent on an amount of color difference for pixel location r. Equations (19)-(21) are examples of modulating the linear gradient according to image color differences:

$$\text{constraint\_f1\_b}(r)=0 \text{ for } [(r-r0)\bullet n]<0 \quad (19)$$

$$\text{constraint\_f1\_b}(r)=1 \text{ for } 1\leftarrow[(r-r0)\bullet n]/|r0-r1| \quad (20)$$

$$\text{constraint\_f1\_a}(r)=[X^*(r-r0)]\bullet n]/|r1-r0| \text{ for all other values of } r \quad (21)$$

where X incorporates the color constraints:

$$X=\exp(-(c(r)-c(r0)^2/(2\text{sigma}^2)) \quad (22)$$

The value of "sigma" controls the color specificity. A typical sigma value for an 8 bit red-green-blue image is 10.

The simple linear gradient functions described above may also be used to calculate mask constraint values when a single positive pixel location and multiple negative pixel locations exist in the set of pixel locations specified by a multi-touch gesture. For example, the mean of all of the negative pixel locations may be calculated. This mean value may replace r0 in the above equations for constraint_f1_a (i.e., equations (15)-(18)) or constraint_f1_b (i.e., equations (18)-(22)). Accordingly, the number of negative pixel locations and/or the spatial standard deviation of the negative pixel locations may be used to modulate the constraint mask. For example, the number of negative pixel locations and/or the spatial standard deviation of the negative pixel locations may control the steepness of the linear gradient of the constraint mask. Such a constraint mask may result in a multi-touch gesture control that produces an effect similar to applying a curve adjustment layer with an associated gradient layer mask in Adobe® Photoshop®.

The above examples for generating an image constraint mask assume that a multi-touch gesture contains two input touch gesture points (i.e., one positive pixel location and one negative pixel location). In a case where a multi-touch gesture includes more than two input touch gestures, the constraint mask may be generated using a polynomial function. More specifically, constraint_f may be defined as a polynomial function which satisfies the constraints of the positive and negative pixel locations. The order of the polynomial function may be selected dependent on a desired spatial complexity of the constraint mask. For example, a lower order polynomial may result in a less spatially complex constraint mask, but also may allow the existing constraints (i.e., of the positive and negative pixel locations) to be more loosely applied to the constraint mask. A higher order polynomial may result in a more spatially complex constraint mask, but may also require a more strict application of the existing constraints to the constraint mask.

Equation (23) is an example of a polynomial function of spatial coordinates which may be used to model the constraint function:

$$\text{constraint\_f1\_c}(r)=c0+\text{Sum}[i]c1[i]r[i]+\text{Sum}[i,j]c2[i,j]r[i]r[j]+\text{Sum}[i,j,k]c3[i,j,k]r[i]r[j]r[k]+ \quad (23)$$

For the polynomial function of equation (23), the summation is over the two spatial indices (x,y) and is associated with each of indices i or j or k. As described above, the order of the polynomial function may be selected dependent on a desired spatial complexity of the constraint mask. The coefficients c0, c1, c2, . . . may be found using a standard mathematical least mean squares algorithm. For example, the energy function of equation (24), which incorporates the constraints, may be minimized.

$$\text{energy}=\text{Sum}[a][1-\text{constraint\_f\_c}(r1[a])]^2+\text{Sum}[b][\text{constraint\_f\_c}(r0[b])]^2 \quad (24)$$

The summation of the energy function of equation (24) may be a summation of all positive pixel locations, indexed by a, and all negative pixel locations, indexed by b. Minimizing the energy function of equation (24) may produce a set of polynomial coefficients for constraint_f1 c(r) that best satisfy (in a least squares sense) the combination of positive and negative constraints imposed by the positive and negative pixel locations. Minimizing the energy function of equation (24) with respect to the constant coefficients c0, c1, c2, . . . may result in a linear matrix equation which may be solved to determine the coefficients. Standard matrix inverse methods may be used to solve the linear matrix equation.

In addition to determining image regions that are subject to modification, a multi-touch gesture may also specify a degree of change that may be applied to an image. For example, the velocity of a touch gesture may specify a degree of change that may be applied to the image region which corresponds to the touch gesture. The degree of change may be proportional to the velocity of the touch gesture. For example, in the case of an image brightness adjustment, the brightness may be increased at a rate that is proportional to the velocity of the touch gesture. As another example, for touch-enabled devices which are configured to sense the pressure of a touch gesture, the amount of pressure may specify the degree of change for an image modification. Alternatively, the pressure of the touch gesture may be used to modulate the spatial extent of the image adjustment. As yet another example, the shape of a touch gesture may also be used to specify a degree of change for an image modification.

Figure 6:
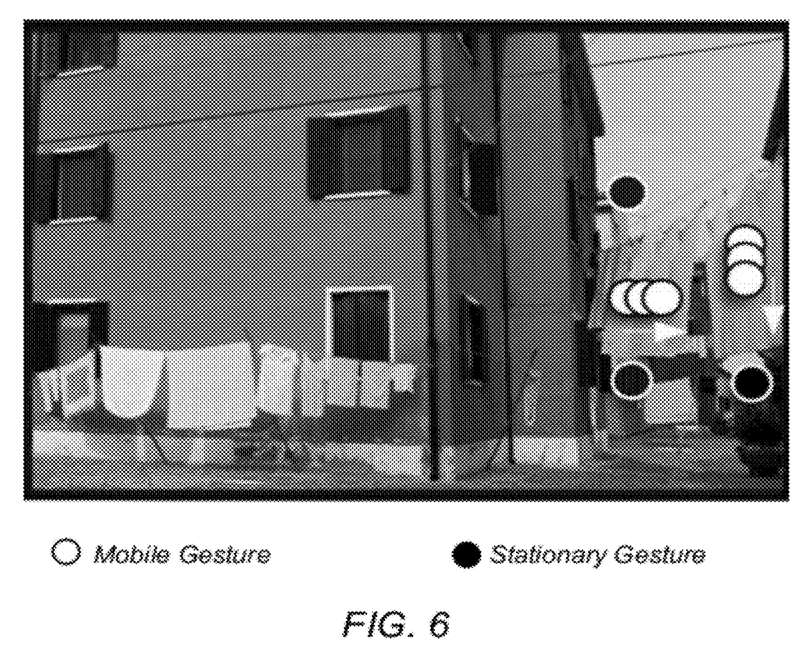
FIG. 6 illustrates an example of defining foreground and background regions of a digital image using mobile and stationary touch gestures applied to a display of the digital image on a touch-enabled device, according to some embodiments.
Figure 7:
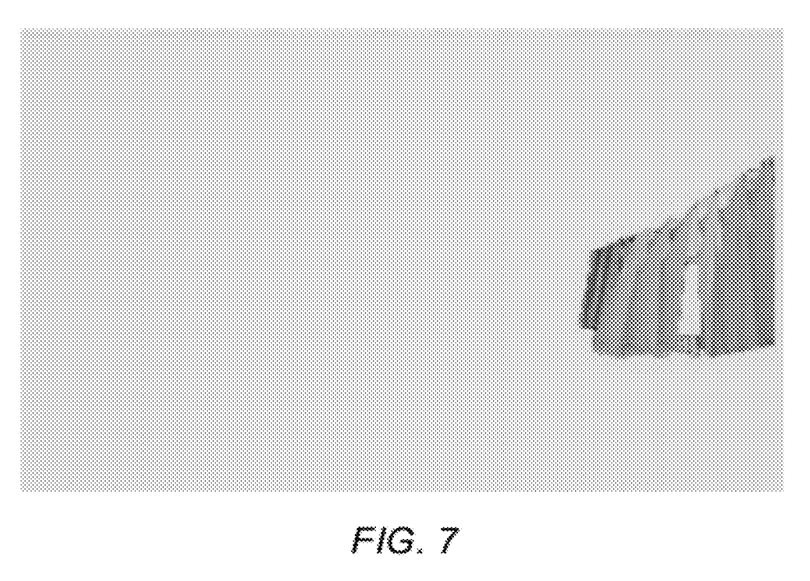
FIG. 7 illustrates an example of a foreground region of a digital image, as defined by the multi-touch gestures illustrated in FIG. 6, according to some embodiments.

The system and methods for processing digital images using multi-touch gestures may also enable a user to select one or more objects in a digital image or generate a complex mask for a digital image. A multi-touch gesture applied to a digital image, as described herein, may provide a mechanism for a user to specify multiple different types of image regions within a multi-touch gestural input set. For example, one or more selected objects may be specified with one gesture type and other non-selected objects may be specified with another gesture type. As another example, a foreground region of an image may be specified with one gesture type and a background region of an image may be specified with another gesture type. FIG. 6 illustrates an example of defining foreground and background regions of a digital image using mobile and stationary touch gestures applied to a display of the digital image on a touch-enabled device, according to some embodiments. The mobile gestures illustrated in FIG. 6 (shown as light circles) may specify a foreground region of the image (i.e., the clothes hanging on the line). The stationary gestures illustrated in FIG. 6 (shown as dark circles) may specify a background region of the image. The specified background region of the image may be "masked out" of the image. FIG. 7 illustrates the resulting image, with only the foreground region remaining visible in the image.

The method described above, in reference to FIG. 3, may be used in a similar manner to determine the constraints that define an image mask. The identified foreground and background regions may be identified, similar to the manner described above, as positive and negative pixel locations. Accordingly, the mask that may be generated by a multi-touch gesture may support various selection or masking algorithms of software applications that require both positive (foreground) and negative (background) samples. As an example, the positive and negative pixel locations described above may serve directly as positive and negative control points for the Quick Selection or Refine Edge soft masking or Color by Range functions of Adobe® Photoshop®. An example of a digital image processing system and method in which at least some embodiments may be implemented to generate a soft mask from foreground and background information is described in U.S. patent application Ser. No. 11/524,219, entitled "IMAGE MASK GENERATION," filed Sep. 19, 2006, whose inventor is Gregg D. Wilensky, and which is hereby incorporated by reference herein in its entirety. Another example of a digital image processing system and method in which at least some embodiments may be implemented to generate a soft mask from foreground and background information is described in U.S. patent application Ser. No. 11/607,206, entitled "IMPROVING IMAGE MASKS," filed Dec. 1, 2006, whose inventor is Gregg D. Wilensky, and which is hereby incorporated by reference herein in its entirety.

Masks generated using a multi-touch gestural input set, as described herein, may be applied as layer masks to an existing image layer or adjustment layer in Adobe® Photoshop®. For example, a touch gesture using two fingers may specify both the direction and magnitude of a gradient that defines an image adjustment layer. A multi-touch gesture which includes more than two touch gestures may be used to generate a complex mask shape. For example, a mask shape that may, for example, produce a vignetting of an image, may specify a darkening of the borders of an image by simultaneously moving four fingers in the vicinity of the four corners of the image.

Other embodiments of the multi-touch gesture system described herein may be applied to digital media forms other than two-dimensional digital images. For example, the digital image may be three-dimensional or beyond. As another example, the media form may be a one-dimensional data object such as a Bezier curve. In such an example, the negative pixel locations may specify static portions of the Bezier curve and the positive pixel locations may specify mobile portions of the Bezier curve. In another embodiment, a multi-touch gesture may be applied, as described herein, to specify multiple processing constraints for a video stream. For example, during playback of a video, multi-touch gestures may be applied to a display of the video to specify and execute various modifications at different locations on the video frames. The multi-touch gestures may provide a quick and simple mechanism that may speed up the video editing process by enabling the video to be edited in real-time, as the video is played back. In yet another embodiment, a multi-touch gesture may be applied, as described herein, to specify multiple processing constraints for an audio stream. For example, a multi-touch gesture may be applied to a display of a spectral representation of an audio stream. Audio frequencies which represent noise may be specified for removal from the audio stream using one type of touch gesture, while audio frequencies which represent desired sounds may be selected to remain in the audio stream using another type of touch gesture.

A gesture module may be implemented in any runtime application, including but not limited to Adobe® Photoshop®, Adobe® Lightroom® or Abode® Camera Raw®. A gesture module may, for example, be implemented as a stand-alone application, as a module of a runtime application such as Adobe® Photoshop®, Adobe® Lightroom® or Abode® Camera Raw®, as a plug-in for applications including image editing applications such as Adobe® Photoshop®, Adobe® Lightroom® or Abode® Camera Raw°, and/or as a library function or functions that may be called by other applications. Note that Adobe® Photoshop®, Adobe® Lightroom® or Abode® Camera Raw® are given as examples, and are not intended to be limiting.

Example System

Figure 8:
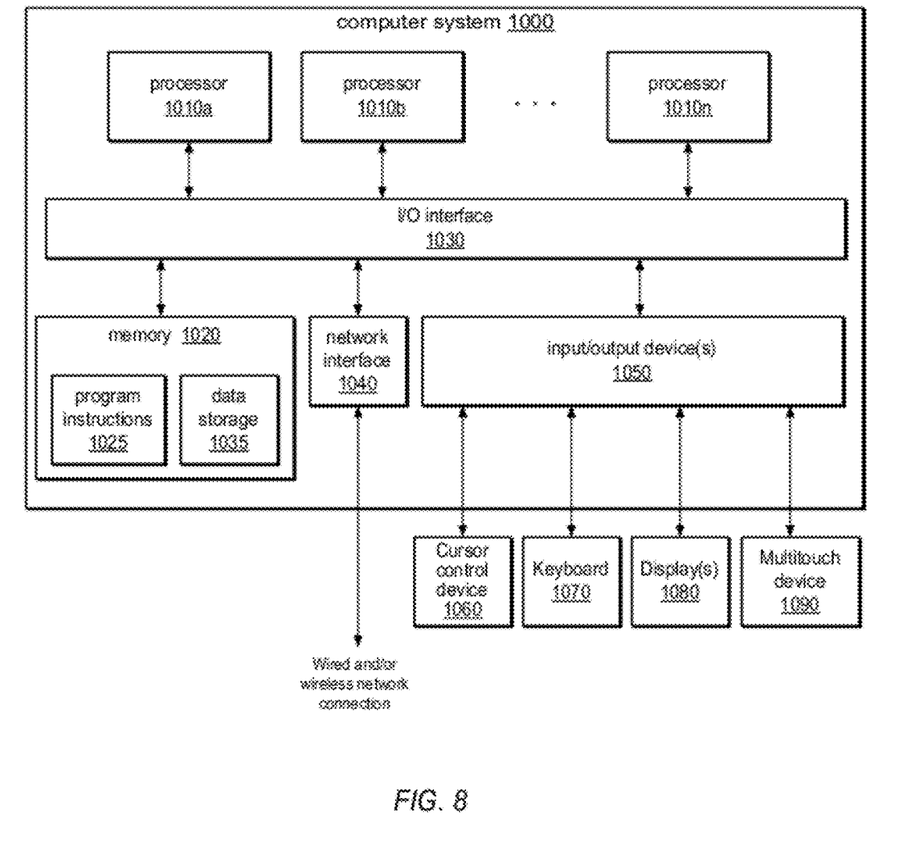
FIG. 8 illustrates an example computer system that may be used in embodiments.

Various components of embodiments of methods as illustrated and described in the accompanying description may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, touch pad, tablet, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   displaying a digital image on an electronic device, wherein the electronic device is configured to receive sets of gestural inputs;
   receiving, via the electronic device, a gestural input set, wherein the gestural input set comprises a plurality of gestures, and wherein each given gesture of the received plurality of gestures:
   corresponds to one of multiple different regions within the digital image; and
   specifies a respective type of image processing constraint for processing the corresponding one of the multiple different regions within the digital image, wherein the respective type of image processing constraint depends on the gesture type of the given gesture;
   wherein the plurality of gestures in the received gestural input set include multiple different types of gestures such that the received gestural input set collectively specifies multiple types of image processing constraints;
   analyzing the received gestural input set to determine, for each region of the multiple different regions, the respective type of image processing constraint for processing the region, as specified by the given gesture of the received plurality of gestures that corresponds to the region; and
   subsequent to receiving the plurality of gestures including multiple different types of gestures, performing a particular image processing operation on the multiple different regions within the digital image according to each region's respective specified image processing constraint as specified by the type of gesture applied to that region.

2. The method of claim 1, wherein the specified image processing constraints are determined without changing an image editing mode within a software application in which the digital image is displayed.

3. The method of claim 1, wherein said analyzing the received gestural input set comprises:
   analyzing gesture data which represents the received gestural input set to determine characteristics of the received gestural input set; and
   identifying a gesture type for each one of the plurality of gestures dependent on the determined characteristics.

4. The method of claim 1, wherein said performing a particular image processing operation on the multiple different regions within the digital image each according to its respective specified image processing constraint comprises generating an image constraint mask dependent on the gesture types of the plurality of gestures.

5. The method of claim 4, wherein said generating the image constraint mask is dependent on the multiple different regions of the digital image.

6. The method of claim 4, wherein the image constraint mask identifies both a foreground region and a background region of the digital image.

7. The method of claim 1, wherein one of the plurality of gestures is a stationary gesture and another one of the plurality of gestures is a mobile gesture, wherein the stationary gesture corresponds to a region of the digital image that is not subject to modification and wherein the mobile gesture corresponds to a region of the digital image that is subject to modification.

8. The method of claim 7, wherein a characteristic of the mobile gesture specifies a degree of modification to be applied to the specified region of the digital image that is subject to modification.

9. The method of claim 1, wherein the electronic device is a touch-enabled device comprising a touch-sensitive surface, and wherein the plurality of gestures are touch gestures applied to the touch-sensitive surface of the electronic device.

10. A non-transitory computer-readable storage medium storing program instructions executable on a computer to implement a gesture module configured to:
    display a digital image on an electronic device, wherein the electronic device is configured to receive sets of gestural inputs;
    receive, via the electronic device, a gestural input set, wherein the gestural input set comprises a plurality of gestures, and wherein each given gesture of the received plurality of gestures:
        corresponds to one of multiple different regions within the digital image; and
        specifies a respective type of image processing constraint for processing the corresponding one of the multiple different regions within the digital image, wherein the respective type of image processing constraint depends on the gesture type of the given gesture;
    wherein the plurality of gestures in the received gestural input set include multiple different types of gestures such that the received gestural input set collectively specifies multiple types of image processing constraints;
    analyze the received gestural input set to determine, for each region of the multiple different regions, the respective type of image processing constraint for processing the region, as specified by the given gesture of the received plurality of gestures that corresponds to the region; and
    subsequent to receipt of the plurality of gestures including multiple different types of gestures, perform a particular image processing operation on the multiple different regions within the digital image according to each region's respective specified image processing constraint as specified by the type of gesture applied to that region.

11. The medium of claim 10, wherein the specified image processing constraints are determined without changing an image editing mode within a software application in which the digital image is displayed.

12. The medium of claim 10, wherein said analyzing the received gestural input set comprises:
    analyzing gesture data which represents the received gestural input set to determine characteristics of the received gestural input set; and
    identifying a gesture type for each one of the plurality of gestures dependent on the determined characteristics.

13. The medium of claim 10, wherein said performing a particular image processing operation on the multiple different regions within the digital image each according to its respective specified image processing constraint comprises generating an image constraint mask dependent on the gesture types of the plurality of gestures.

14. The medium of claim 13, wherein said generating the image constraint mask is dependent on the multiple different regions of the digital image.

15. The medium of claim 10, wherein one of the plurality of gestures is a stationary gesture and another one of the plurality of gestures is a mobile gesture, wherein the stationary gesture corresponds to a region of the digital image that is not subject to modification and wherein the mobile gesture corresponds to a region of the digital image that is subject to modification.

16. The medium of claim 15, wherein a characteristic of the mobile gesture specifies a degree of modification to be applied to the specified region of the digital image that is subject to modification.

17. A system, comprising:
    a memory; and
    one or more processors coupled to the memory, wherein the memory comprises program instructions executable by the one or more processors to implement a gesture module configured to:
        display a digital image on an electronic device, wherein the electronic device is configured to receive sets of gestural inputs;
        receive, via the electronic device, a gestural input set, wherein the gestural input set comprises a plurality of gestures, and wherein each given gesture of the received plurality of gestures:
            corresponds to one of multiple different regions within the digital image; and
        specifies a respective type of image processing constraint for processing the corresponding one of the multiple different regions within the digital image, wherein the respective type of image processing constraint depends on the gesture type of the given gesture;
        wherein the plurality of gestures in the received gestural input set include multiple different types of gestures such that the received gestural input set collectively specifies multiple types of image processing constraints;
        analyze the received gestural input set to determine, for each region of the multiple different regions, the respective type of image processing constraint for processing the region, as specified by the given gesture of the received plurality of gestures that corresponds to the region; and
        subsequent to receipt of the plurality of gestures including multiple different types of gestures, perform a particular image processing operation on the multiple different regions within the digital image according to each region's respective specified image processing constraint as specified by the type of gesture applied to that region.

18. The system of claim 17, wherein the specified image processing constraints are determined without changing an image editing mode within a software application in which the digital image is displayed.

19. The system of claim 17, wherein said performing a particular image processing operation on the multiple different regions within the digital image each according to its respective specified image processing constraint comprises generating an image constraint mask dependent on the gesture types of the plurality of gestures, wherein said generating the image constraint mask is dependent on the multiple different regions of the digital image.

20. The system of claim 17, wherein one of the plurality of gestures is a stationary gesture and another one of the plurality of gestures is a mobile gesture, wherein the stationary gesture corresponds to a region of the digital image that is not subject to modification and wherein the mobile gesture corresponds to a region of the digital image that is subject to modification.

* * * * *